No. 612,394. Patented Oct. 18, 1898.
J. A. BERNARDI.
GASKET.
(Application filed Nov. 2, 1897.)
(No Model.)
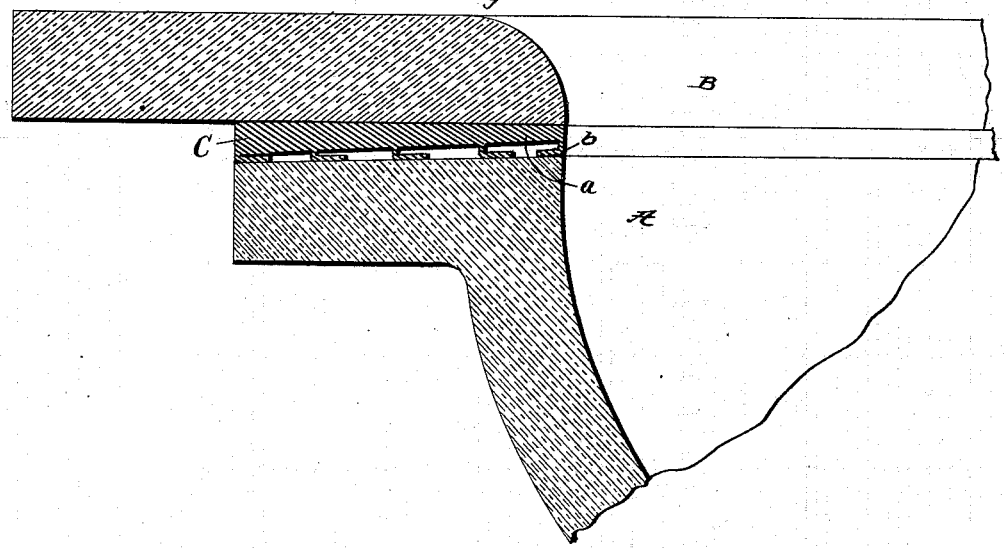
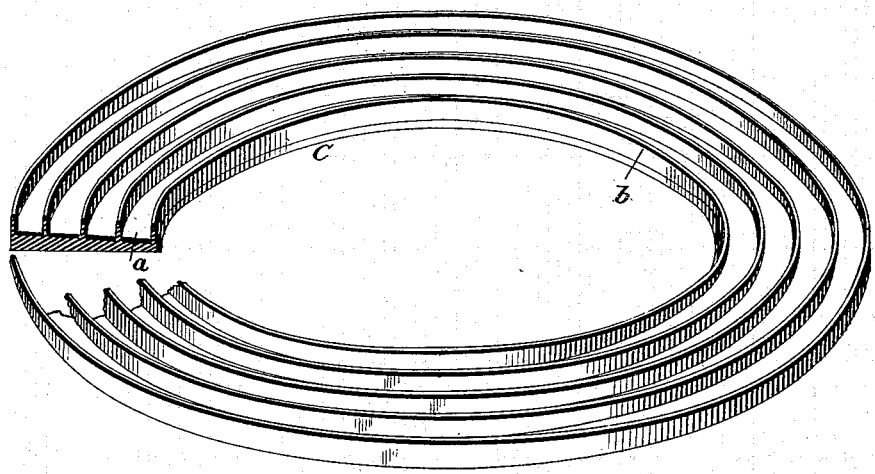
Witnesses:
Inventor
J. A. Bernardi
By J. J. Sheehy
Attorney ptional
UNITED STATES PATENT OFFICE.

JOSEPH ANTHONEY BERNARDI, OF SALEM, OREGON.

GASKET.

SPECIFICATION forming part of Letters Patent No. 612,394, dated October 18, 1898.

Application filed November 2, 1897. Serial No. 657,158. (No model.)

*To all whom it may concern:*

Be it known that I, JOSEPH ANTHONEY BERNARDI, a citizen of the United States, residing at Salem, in the county of Marion and State of Oregon, have invented certain new and useful Improvements in Gaskets; and I do declare the following to be a full, clear, and exact description of the invention, such as will enable others skilled in the art to which it appertains to make and use the same.

My invention relates to improvements in that class of gaskets which are interposed between the upper sides of washbowls and the marble or other slabs with which the bowls are connected.

It is well known to the trade that while marble slabs generally have a smooth and flat under side the upper surfaces of washbowls or basins are frequently inclined outwardly and downwardly and are as often uneven.

My invention has for its general object to provide a gasket which when interposed between a slab and bowl will accommodate itself to the surface of the upper side of the bowl and in all cases afford a firm bearing for the marginal portion of the bowl and render the connection of the bowl to the slab perfectly water-tight at all points, so as to prevent the accumulation of filth between the same.

With the foregoing objects in view my invention will be fully understood from the following description and claim when taken in connection with the annexed drawings, in which—

Figure 1 is a cross-sectional view of a part of a bowl or basin and a slab with my improvements applied, and Fig. 2 is a perspective broken sectional view of my improved gasket removed.

Referring by letter to said drawings, A indicates a bowl or basin, and B a slab of marble or other suitable material, neither of which forms any part of my invention, but are here shown for the purpose of illustrating my improvements in an operative position.

The improved gasket C is preferably composed of rubber and may be either of circular or oval form in outline, according to the shape or configuration of the bowl or basin employed. I prefer to make the gasket of rubber or pure rubber gum, for the reason that it may be cheaply manufactured from such material, and owing to its waterproof qualities and elastic nature it will not only exclude water and moisture, but will also serve as a cushion. The gasket has a flat upper side; but its under side is inclined upward from its outer to its inner edge, as shown at $h$, and this pitched or inclined surface is provided with depending ribs or flanges $b$, there being five shown in the present illustration, although it is obvious that more or less may be used. These flanges, which are illustrated as parallel, may be disposed in an irregular manner, if desired, although I prefer to form them as shown. The gasket is of a width corresponding to the top of the bowl or basin, and the innermost rib $b$ is designed to bear snugly upon the upper side of the bowl or basin and at its inner marginal edge.

In virtue of the upper side of the gasket being flat and its under side inclined upwardly and inwardly it will be seen that a firm bearing will be afforded the marginal portion of the bowl—that is to say, the portion adjacent to the margin—when the upper surface of the bowl is flat and smooth and also when it is inclined downwardly and outwardly and is uneven. This is advantageous because a constant pressure is exerted against the clamps usually employed for connecting bowls to slabs and they are effectually prevented from working loose. The ribs or flanges $b$ of the gasket accommodate themselves to the space between the inclined under side of the gasket and the upper surface of the bowl—that is to say, they are turned under to a greater or less extent, according to the size of the space. They always, however, by tending to resume their straight condition, exert a pressure against the bowl at all points throughout their length. Consequently it will be seen that they will accommodate themselves to any unevenness that may occur in the upper side of the bowl and by so doing will effectually prevent the entry of water and the accumulation of filth between said bowl and the slab to which it is connected. By exerting a pressure against the bowl, as stated, the said ribs or flanges $b$ will assist in preventing the connecting-clamps from becoming loose and will form a cushion between the slab and bowl, which will tend to prevent the same from being broken.

Having thus described my invention, what I claim is—

The gasket formed of rubber or the like and having the flat upper side and the under side inclined downwardly and outwardly from its inner to its outer edge and also having the ribs or flanges $b$ on its under side; the whole being adapted for interposition between a bowl and a slab, substantially as specified.

In testimony whereof I affix my signature in presence of two witnesses.

JOSEPH ANTHONEY BERNARDI.

Witnesses:
   CHES. WILSON,
   GEO. H. DUNSFORD.